United States Patent [19]

Kobayashi et al.

[11] Patent Number: 5,023,855
[45] Date of Patent: Jun. 11, 1991

[54] OPTICAL DISC ACCESS CONTROL SYSTEM THAT COUNTS TRACKS USING TRACKING CONTROL SIGNAL

[75] Inventors: Seiji Kobayashi, Tokyo; Kiyoshi Ohsato, Chiba, both of Japan

[73] Assignee: Sony Corporation, Tokyo, Japan

[21] Appl. No.: 170,352

[22] Filed: Mar. 18, 1988

[30] Foreign Application Priority Data

Mar. 25, 1987 [JP] Japan .................................. 62-72831

[51] Int. Cl.$^5$ ............................................. G11B 7/00
[52] U.S. Cl. .................................... 369/44.28; 369/32; 369/44.370
[58] Field of Search ............................ 369/32, 44–46; 250/201 DF

[56] References Cited

U.S. PATENT DOCUMENTS

| Re. 32,937 | 5/1989 | Silvy et al. ................. | 369/111 X |
| 4,541,083 | 9/1985 | Maeda et al. ................ | 369/44 |
| 4,607,358 | 8/1986 | Maeda et al. ................ | 369/44 |
| 4,740,940 | 4/1988 | Tanaka et al. ................ | 369/46 |
| 4,805,050 | 2/1989 | Aoyagi et al. ............... | 369/32 X |
| 4,809,251 | 2/1989 | Collomby et al. ............ | 369/32 |

Primary Examiner—Aristotelis M. Psitos

[57] ABSTRACT

An apparatus for counting a number of record tracks which an optical head traverses on a basis of a periodical track transverse information $INF_{TR}$ representing the traverse of the head across the record tracks. The periodical track transverse information $INF_{TR}$ is derived by sampling information on the record tracks performed discretely on record tracks TR. In the tracks counting apparatus, a tracking signal generating circuit is installed for generating tracking signals $V_{OP}$ and $V_{OQ}$ which vary their frequencies and phases so as to follow those of the track transverse information $INF_{TR}$. The number of record tracks which the optical head has traversed are counted on the basis of the tracking signals $V_{OP}$ and $V_{OQ}$. The tracking signals $V_{OP}$ and $V_{OQ}$ have continuous waveforms so that the number of tracks can accurately be counted even if the only discrete information is derived as the track transverse information $INF_{TR}$.

9 Claims, 6 Drawing Sheets

OPTICAL DISC ACCESS CONTROL SYSTEM THAT COUNTS TRACKS USING TRACKING CONTROL SIGNAL

BACKGROUND OF THE INVENTION (1) Field of the Invention

The present invention relates to an apparatus for counting the number of record tracks formed on an optical disc. The present invention relates particularly to the apparatus therefor applicable to an access control system used in a sample servo type optical disc apparatus.

(2) Background of the Art

Successive pit servo type and sample servo type tracking methods applied to, for example, a tracking read/write type optical disc have been proposed.

Optically and magneto-optically recordable discs are known. One has a preformed continous groove as shown in JP-A-52-10102, published on Jan. 26,1977, the other has preformed pits as shown in U.S. Pat. Nos. 4,402,061 and 4,561,082. A tracking servo is carried out for the preformed continous groove or preformed pits on the disc. The former we call a continous servo type, the latter a sample servo type, hereinafter.

In a previously proposed optical disc using the sample servo method, an optical head is accessed onto a desired record track having a prerecorded address. At this time, an optical head access driving portion including, e.g., a thread motor is driven in response to an access control signal CONT supplied from a system controller, so that the optical head traverses the record tracks.

During the transverse operation of the optical head, a pick-up signal PU derived from the optical head is inputted to a pick-up signal processing circuit. In addition, a tracking information $S_{TRK}$ is outputted from the pick-up signal processing circuit. The tracking information $S_{TRK}$ is periodically derived when the optical head traverses one of the record tracks is inputted into a track counting apparatus and the optical head access driving portion is driven until the counted contents of the track counting apparatus coincides with one of the tracks to be accessed.

In the case of the sample servo type optical disc, the record tracks TR (- - - $TR_{n-1}$, $TR_n$, $TR_{n+1}$, - - -) formed on the optical disc have a servo area ERP and data recording area ERD, which are aligned in a radial direction and, are alternatingly conjoined in a sequential order on each same track. Therefore, the data recorded on the data recording area ERD do not interfere with the tracking information and clocking information recorded on the servo area.

A pair of tracking pits PA, PB preformed in the servo area ERP are offset toward an inside and outside of a center line of the above-described record tracks by a ¼ (one-fourth) pitch with respect to the center line CET of the above-described record tracks. In addition, a pit PC for a clocking signal is formed on the center line CET.

When a read light beam LAR the center line CET so that the light beam impinges sequentially on the pits PA, PB, and PC, the optical head can detect the three pits PA, PB, and PC as the change of reflected light beam from these pits.

The pick-up signal derived at the optical head on the basis of the reflected light beam from the disc is sampled and held (sample/hold) by means of a sampling pulse generated by the pick-up signal processing circuit at a timing at which the read light beam LAR passes through the pits PA, PB, and PC. The pick up signal processing circuit can produce the tracking information representing a positional difference between the read light beam LAR and center line CET and produce clock information representing a timing at which the read light beam LAR has passed on the clocking signal pit PC.

The system controller carries out a tracking control for the optical head so that the read light beam LAR scans the center line CET of the record tracks - - - $TR_{n-1}$, $TR_n$, $TR_{n-1}$, - - - on the basis of the tracking information derived in the pick-up signal processing circuit. The pick-up signal processing circuit generates a sampling pulse which is synchronized with the phase of the clocking information, so that the magnetically-optio recorded data on the data recording area ERD is sampled from the pick-up signal PU in accordance with the sampling pulse.

The track counting apparatus counts the number of tracks which the read light beam has traversed on the basis of the tracking information $S_{TRK}$ transmitted from the pick-up signal processing circuit during the head access operation.

In detail, when the read light beam LAR traverses the record tracks TR sequentially, a track transverse information $INF_{TR}$ sampled by means of the sampling pulse signal $P_s$ at a timing of the tracking signal pits PA and PB exhibits a change corresponding to one period of a sinusoidal wave during the time when the read light beam LAR is moved from one record track $TR_n$ to the other track $TR_{n-1}$ (or $TR_{n+1}$) at the outside (or inside) adjacent to the track $TR_n$.

Since the pair of tracking pits PA and PB are formed in a discrete configuration with the data recording area ERD sandwiched, a track transverse information $INF_{TR}$ constituted by a stepwise, sinusoidal waveform is obtained. The track transverse information $INF_{TR}$ is passed through a filter so that a clear phantom track transverse information $INF_{TRX}$ is derived. Therefore, the track counting apparatus can count the number of record tracks which the read light beam LAR has traversed by counting the number of times the track transverse information $INF_{TR}$ traverses a predetermined threshold level SHD on the basis of the change of the sampled track transverse information $I_{TR}$.

If a transverse speed of the head becomes increased when the counting apparatus counts the number of the record tracks which the light beam LAR has traversed on the basis of the track information $INF_{TR}$, it may become impossible for the track counting apparatus to accurately count the number of tracks which the read light beam has traversed.

In detail, the optical head gradually accelerates from a state in which the speed is zero during an accelerated transverse interval of time $T_1$ immediately after the optical head has started, until the optical head accesses at a high speed one of the other tracks from a state during which the head is tracking one of the record tracks. Therefore, a period of the phantom track transverse information $INF_{TRX}$ (hence, the track transverse information $INF_{TRX}$ is gradually reduced until the head enters a high-speed transverse interval at which the head moves at a high velocity.

On the contrary, since the sampling period of the sampling pulse used in the pick-up signal processing circuit is constant, the number of samplings per period of the track transverse interval information $INF_{TR}$ at an interval of the accelerated transverse $T_1$ of the head are gradually reduced. Thereafter, at the high-speed transverse interval, a time axis is expanded so that the sampling period $\alpha$ becomes substantially equal to one period $\alpha_{TRX}$ of the phantom track transverse information $INF_{TRX}$. Consequently, a value of the track transverse information $INF_{TR}$ enters in a state in which, for example, only several numbers of sampling information can be extracted during one period of the above-described sampling.

If the transverse speed is further increased and the period $\tau_{TRX}$ of the phantom track transverse information $INF_{TRX}$ becomes shorter than the sampling period $\tau_{SP}$ of the sampling pulse $P_S$, only one sampling information can be extracted for several periods of the phantom track transverse information $INF_{TRX}$ as the track transverse information $INF_{TR}$.

In such a state as described above, the track transverse information cannot be reproduced having the same contents as the phantom track transverse information $INF_{TR}$ before the sampling from the track transverse information $INF_{TR}$. Hence, even when the track transverse information $INF_{TR}$ exceeds the predetermined threshold level SHD, the reliability that the track transverse information $INF_{TR}$ represents the correct number of the traversed tracks becomes reduced.

Suppose that the above-described state has a relationship of a trajectory LARX of the read light beam LAR with respect to the record tracks TR. For example, the read light beam LAR has traversed five record tracks $TR_n$ to $TR_{n+4}$ while the trajectory LARX is passing through the data recording area ERD between the mutually adjoining servo areas ERP. In this case, only one sampling information can be obtained while the phantom track transverse information $INF_{TRX}$ changes by five periods.

Information corresponding to the phantom track transverse information $INF_{TRX}$ cannot be reproduced from this one sampling information.

As a matter of fact, if the transverse speed of the read light beam LAR becomes so high that a theorem of sampling cannot be satisfied, the number of the head traversed tracks cannot be counted in the previously proposed method described above Especially, in a case where the record tracks are sampled at a sampling frequency of 41 kHz for the representative optical disc having 1.5 micrometers of a track pitch and the read light beam LAR has traversed at a speed such as to generate the phantom track transverse information $INF_{TRX}$, the read light beam LAR traverses the record tracks TR at a speed of 3 cm/sec. If the read light beam LAR traverses at a higher speed, the transverse track information cannot be reproduced in terms of the sampling theorem. Therefore, the information access speed from the optical disc is limited at a relatively slow speed value.

SUMMARY OF THE INVENTION

It is therefore an object of the present invention to provide an apparatus for counting a number of record tracks on an optical disc which reliably assures the counting of the traversed number of record tracks even when the access speed of the optical head becomes relatively high as compared with the sampling period.

The above-described object can be achieved by providing an apparatus for counting a number of record tracks which an optical head traverses on the basis of a track transverse information signal derived through a periodic sampling of a signal indicative of a track information discretely formed on record tracks, the apparatus comprising: (a) a tracking signal generating circuit for generating tracking signals whose frequencies and phases are varied so as to follow those of the track transverse information signal; and (b) means for counting the number of record tracks which the optical head has traversed on the basis of the tracking signal generated by the tracking signal generating circuit.

The above-described object can also be achieved by providing an apparatus for counting a number of record tracks in an optical disc device for a recordable disc on which first tracking pits and clocking pits are previously formed in a discrete manner, the counting apparatus comprising: (a) first means for providing a tracking error signal on the basis of the tracking pits; (b) second means for providing a clock reproduction signal on the basis of the clocking pits; (c) third means for generating a first tracking signal following a frequency and/or phase of the tracking error signal and generating a second tracking signal following a frequency and/or phase of the clock reproducing signal; and (d) fourth means for counting the number of tracks which the optical head has traversed on the basis of the first tracking signal and second tracking signal.

The above-described object can also be achieved by providing apparatus for counting a number of record tracks which a head traverses during an access of the record tracks, the apparatus comprising: (a) first means for generating at least one continuous wave signal, at least one of frequency and phase of which is varied so as to follow the corresponding frequency or phase of a discrete information on the head transverse of the recorded tracks derived by the head; and (b) second means for counting the number of tracks on the basis of the continous wave signal generated by the first means.

DETAILED DESCRIPTION OF THE PREFERRED EMBODIMENTS

Reference will hereinafter be made to the drawings in order to facilitate understanding of the present invention.

Figure 1:
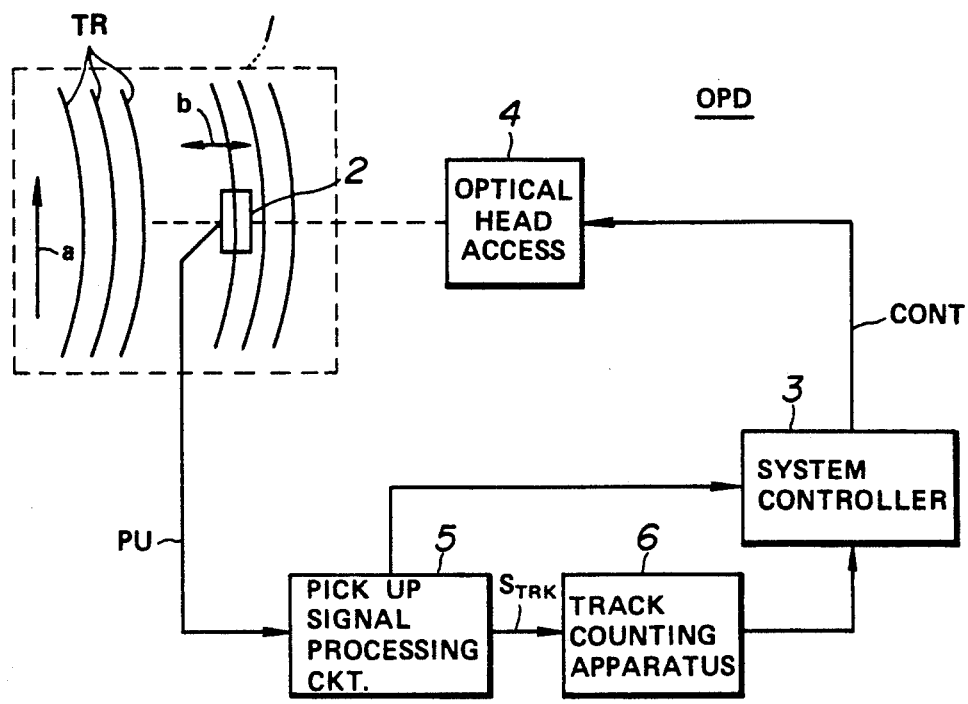
FIG. 1 is simplified circuit block diagram of an optical disc device to which an apparatus for counting a number of record tracks according to the present invention is applicable.

FIG. 1 shows a whole optical disc device to which the present invention is applicable.

Each function of circuits shown in FIG. 1 has already described in the Background of the Art of specification. In FIG. 1, numeral 1 denotes the optical disc, numeral 2 denotes an optical head, numeral 3 denotes the system controller, numeral 4 denotes the optical head driving portion, numeral 5 denotes the pick up signal processing circuit, and numeral 6 denotes the track counting apparatus according to the present invention.

Figure 2:
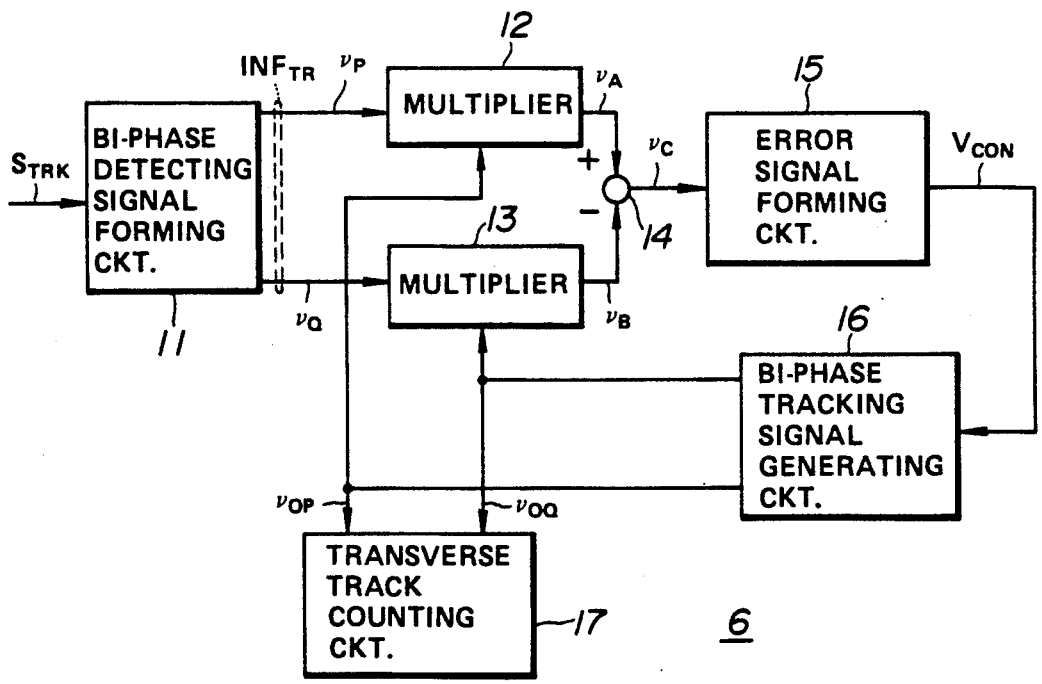
FIG. 2 is a simplified circuit block diagram of the track counting apparatus according to the present invention for explaining a theoretical construction of the track counting apparatus shown in FIG. 1.

FIG. 2 shows a whole circuit construction of the track counting apparatus 6 according to the present invention for explaining a basic concept of the present invention.

A bi-phase detecting signal forming circuit 11 receives a track transverse information $S_{TRK}$ from the pick-up signal processing circuit 5 shown in FIG. 1 and outputs a first phase detecting signal $V_P$ and a second detecting signal $V_Q$ to multipliers 12 and 13 as a track transverse information $INF_{TR}$. The multiplied outputs $V_A$ and $V_B$ are subtracted by a subtractor 14. The subtracted output $V_C$ is converted into an analog control signal $V_{CON}$ of a direct current voltage output signal by means of an error signal forming circuit 15. The control signal $V_{CON}$ is supplied to a bi-phase tracking signal generating circuit 16.

The bi-phase tracking signal generating circuit 16 includes a bi-phase voltage controlled oscillator (a bi-phase VCO) and generates a first phase and second phase tracking signals $V_{OP}$ and $V_{OQ}$ constituted by sinusoidal waves having mutually different phases differing by 90 degrees. These tracking signals are supplied to the multipliers 12 and 13.

In FIG. 2, the bi-phase detecting signal generating circuit 16 generates the first phase and second phase detecting signals $V_P$ and $V_Q$ having mutually different phases differing by 90 degrees in the following on the basis of the transverse speed v of the optical head 2.

$$V_P = \sin(2\pi vt) \qquad (2)$$

$$V_Q = \cos(2\pi vt) \qquad (2)$$

On the other hand, the first phase tracking signal $V_{OP}$ and second phase tracking signal $V_{OQ}$ can be expressed as follows:

$$V_{OP} = \cos(2\pi vt + \Delta\phi) \qquad (3)$$

$$V_{OQ} = \sin(2\pi vt + \Delta\phi) \qquad (4)$$

In this way, the first phase tracking signal $V_{OQ}$ and second tracking signal $V_{OP}$ are signals whose phases are different in phase by $(\pi/2 + \Delta\phi)$ from the corresponding first and second phase detecting signals $V_P$ and $V_Q$.

It is noted that $\Delta\phi$ denotes a minute phase difference. Thus, the multiplied outputs $V_A$ and $V_B$ are obtained which are expressed as follows:

$$\begin{aligned} V_A &= V_P \times V_{OP} \\ &= \sin(2\pi vt)\cos(2\pi vt + \Delta\phi) \end{aligned} \qquad (5)$$

$$\begin{aligned} V_B &= V_Q \times V_{OQ} \\ &= \cos(2\pi vt)\sin(2\pi vt + \Delta\phi) \end{aligned} \qquad (6)$$

Consequently, a value of the subtracted output $V_C$ of the subtractor 14 can be expressed as follows:

$$\begin{aligned} V_C &= V_A - V_B \\ &= \sin(2\pi vt)\cos(2\pi vt + \Delta\phi) - \cos(2\pi vt + \Delta\phi) \\ &= \sin(2\pi vt - 2\pi vt - \Delta\phi) \\ &= \sin(-\Delta\phi) \end{aligned} \qquad (7)$$

In the way described above, the value of the subtracted output $V_C$ has a phase of the minute phase difference $\Delta\phi$, i.e., a difference in phase between the first and second phase detecting signals $V_P$ and $V_Q$ and the first and second phase tracking signals $V_{OP}$ and $V_{OQ}$.

If the minute phase difference $\Delta\phi$ has a negligibly small value, the subtracted output $V_C$ can be derived as a value approximate to the minute phase difference $-\Delta\phi$. Actually, the subtracted output is a signal having only a very low-frequency component (several kilohertz).

The subtracted output $V_C$ is converted to a control signal $V_{CON}$ constituted by a direct current voltage in the error signal generating circuit 15 so as to control the oscillation frequency of the bi-phase tracking signal generating circuit 16 so that the minute phase difference $\Delta\phi$ becomes zero.

The bi-phase tracking signal generating circuit 16 is operated so as to behave like a PLL (Phase Locked Loop) circuit to zero the subtracted output $V_C$. When the change of the transverse speed v included as the variables in the first and second phase detecting signals $V_P$ and $V_Q$ supplied from the bi-phase detecting signal forming circuit 11 causes the change in the phase with respect to time, the first and second phase tracking signals $V_{OP}$ and $V_{OQ}$ are continued to be supplied to the multipliers 12 and 13 and transverse track counting circuit 17.

The first phase and second phase tracking signals $V_{OP}$ and $V_{OQ}$ of the bi-phase tracking signal generating circuit 16 are supplied to the transverse track counting circuit 17. For example, when an instantaneous value of the first phase tracking signal $V_{OP}$ rises from a negative (minus) direction to a positive (plus) direction, the tracking counting circuit 17 continues to count by one (increment) upon determination that the optical head 2 traverses one of the record tracks TR.

In FIG. 2, the number of the traversed tracks are counted on the basis of the track signals $V_{OP}$ and $V_{OQ}$ comprising a continuous wave having the frequency and phrase which follow those of the track transverse information $INF_{TR}$. Therefore, even when a discrete sampling signal is received as the track transverse information $INF_{TR}$, the number of transverse tracks can be counted without error.

When the optical head 2 accesses from one record track TR to the other record track TR, the transverse movement of the optical head 2 is started from one of the record tracks TR which has been tracked up till now. At this time, a gradual acceleration is carried out due to a mechanical inertial force. Therefore, the change of phase (hence, a frequency change) of the first phase detecting signal $V_P$ representing a tracking error is relatively slow. However, the bi-phase tracking signal generating circuit 16 can change the oscillation frequency (hence, phase) at a response speed sufficiently fast as an electrical PLL loop. Hence, even if the frequency of the first phase detecting signal $V_P$ becomes extremely high, the bi-phase tracking signal generating circuit 16 follows the first phase tracking signal $V_P$ so as to oscillate at an extremely high oscillation frequency.

In addition, the bi-phase tracking signal generating circuit 16 transmits the tracking signals $V_{OP}$ and $V_{OQ}$ of the continous waves. Therefore, even if the discrete sampling information has arrived thereat as the track transverse information $INF_{TR}$, the number of transverse tracks can accurately be counted.

Since the subtracted output $V_C$ as a reference to control the bi-phase tracking signal generating circuit 16 includes only a low frequency component, the control of the bi-phase tracking signal generating circuit 16 can practically be facilitated.

Especially, when the speed of the optical head 2 is 1 m/sec and the track pitch is 1.5 micrometers, the frequency of the first phase detecting signal $V_P$ becomes considerably high so as to give $1 [m/sec]/1.5 [\mu m] = 660$ [kHz]. In the circuit construction of FIG. 2, the frequency component of the multiplied output $V_C$ is only at several kilokertz even if the sample clock frequency on the order of several tens of kilohertz.

Figure 3:
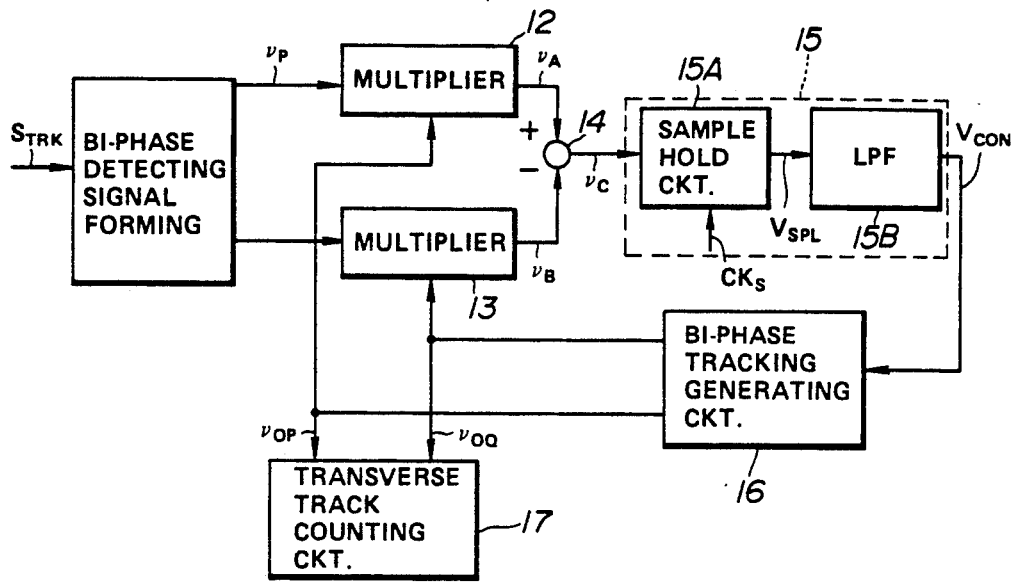
FIG. 3 is a simplified circuit block diagram of the track counting apparatus in a first preferred embodiment according to the present invention.

FIG. 3 shows a first preferred embodiment of the track counting apparatus 6.

In FIG. 3, the error signal forming circuit 15 supplies the sample/hold output $V_{SPL}$ of the sample/hold circuit 15A receiving the subtracted output $V_C$ to the bi-phase tracking signal generating circuit 16 as the control signal $V_{CON}$ via a low-pass filter 15B.

In this embodiment, the sample/hold circuit 15A receives a standard sample clock signal $CK_S$ (for example, a frequency of 41 [kHz]) to sample the subtracted output $V_C$ having the same period as the sampling period sampling the track transverse information $INF_{TR}$.

Figure 4:
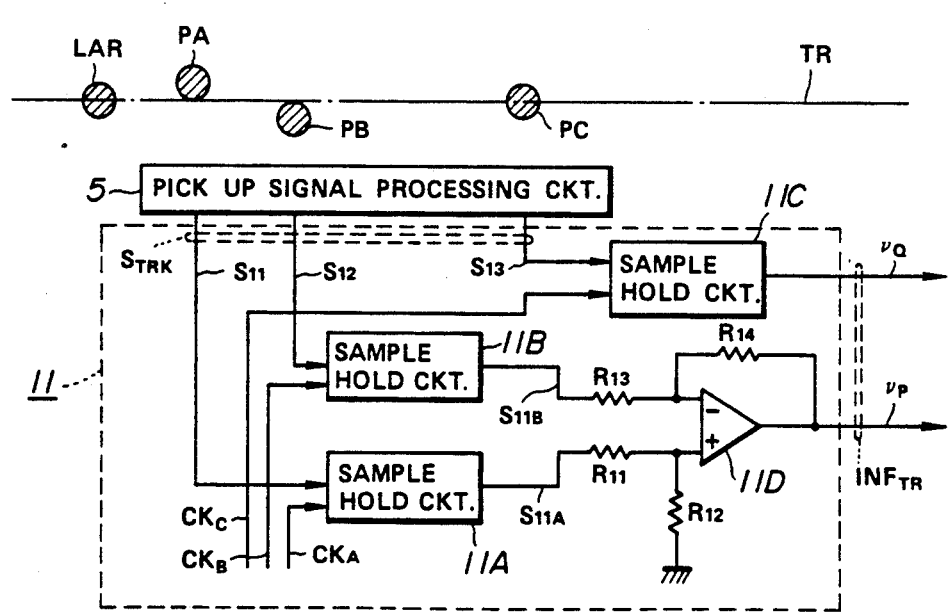
FIG. 4 is a simplified circuit wiring diagram of a bi-phase detecting signal forming circuit shown in FIG. 2.

In addition, the bi-phase detecting signal forming circuit 11, as shown in FIG. 4, supplies detecting signals S11, S12, and S13 of the pick-up signal processing circuit 5 to the sample/hold circuits 11A, 11B, and 11C operating from the sample clock signals $CK_A$, $CK_B$, and $CK_C$.

The pick-up signal processing circuit 5 samples the detecting signals S11, S12, and S13 corresponding to brightness of the reflected beam on the pits $P_A$, $P_B$ and $P_C$ by means of the sample clock signals $CK_A$, $CK_B$, and $CK_C$ derived at a timing at which the read light beam sequentially irradiates the tracking signal pits PA and PB and the clocking signal pit PC and supplies them to the sample/hold circuits 11A, 11B, and 11C.

The sample/hold circuit 11C for the clocking pit $P_C$ supplies the sampled and held output to the multiplier 13 shown in FIG. 1 as the second phase detecting signal $v_Q$.

The sampled and held outputs $S_{11A}$ and $S_{11B}$ of the sample/hold circuits 11A and 11B are supplied to an inverting input terminal and noninverting input terminal of an operational amplifier 11D having input resistors R11, R12, and R13 and feedback resistor R14 so that a tracking error signal as denoted by $v_p$ is produced at an output terminal of the operational amplifier 11D representing a relative positional offset of the tracking pits PA and PB with respect to the read light beam LAR. The tracking error signal is supplied to the multiplier 12 shown in FIG. 3 as the first phase detecting signal $v_P$.

Figure 5:
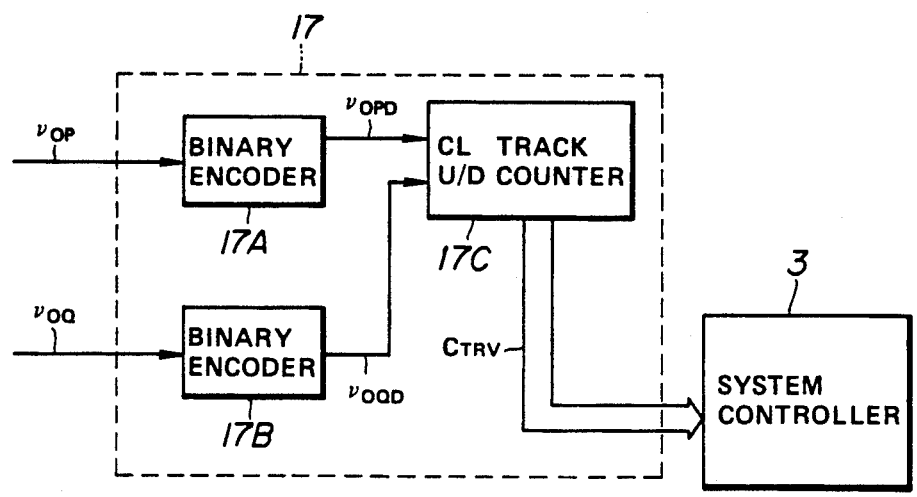
FIG. 5 is a simplified circuit wiring diagram of a traversed track count circuit shown in FIG. 3.

The transverse track counting circuit 17 shown in FIG. 3 receives the first phase and second phase tracking signals $V_{OP}$ and $V_{OQ}$ transmitted from the bi-phase tracking signal generating circuit 16 at respective binary encoders 17A and 17B therein, as shown in FIG. 5.

The binary encoders 17A and 17B supply binary encoded outputs and $V_{OPD}$ and $V_{OQD}$ whose levels rise to a logical high ("H") level during a positive half period of the first and second tracking signals $V_{OP}$ and $V_{OQ}$ constituted by the sinusoidal wave to a clock input terminal CL of the track counter 17C and up/down control input terminal U/D.

The track counting circuit 17C is controlled in an up-count (increment) operation state (or down-count (decrement) operation state) when the second binary coded output $V_{OQD}$ is at a logical high ("H") level (or logical low ("L") level). The track counter 17C counts up (increments) or counts down (decrements) depending on whether a rising edge of the first binary-coded output $V_{OPD}$ is at a logical high level or logical low level. This logical level represents a state in which the optical head 2 traverses in an inner direction or outer direction of the disc 1. The counted contents of the track counter 17C are supplied to the system controller 3 of the optical disc device as the transverse track count output $C_{TRV}$ representing the number of tracks over which the read light beam LAR have traversed. The system controller 3 drives the optical head driving portion 4 according to the contents of the track count output $C_{TRV}$.

Figure 6:
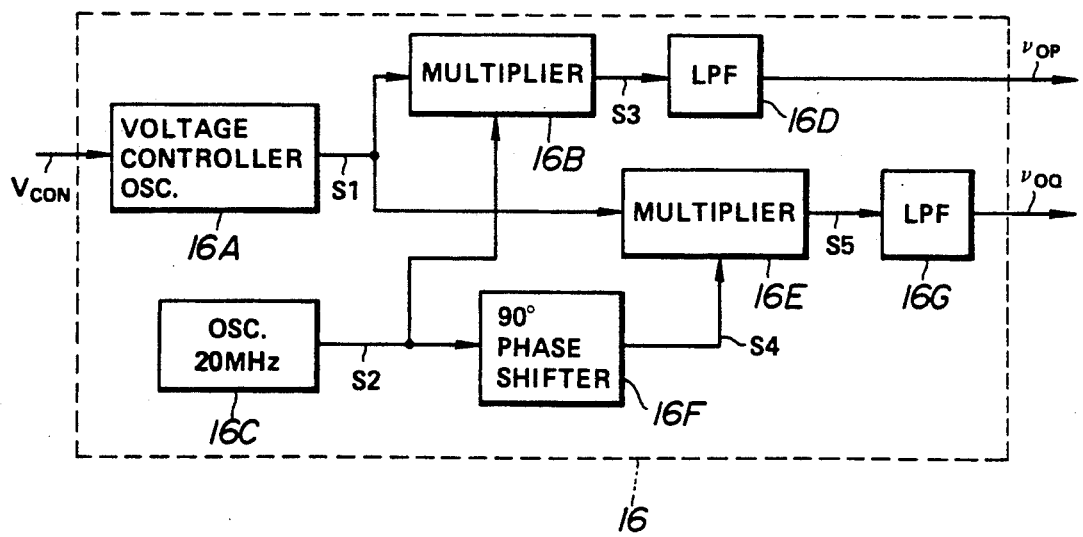
FIG. 6 is a simplified circuit wiring diagram of a bi-phase tracking signal generating circuit shown in FIG. 3.

As shown in FIG. 6, the bi-phase tracking signal generating circuit 16 in FIG. 3 includes a voltage controlled oscillator ($V_{CO}$) 16A which outputs an oscillated output S1 having a predetermined frequency range, e.g., from 19 to 21 [MHz] according to the control signal $V_{CON}$. The oscillated output S1 is multiplied by an oscillated output S2 having a predetermined frequency, e.g., 20 MHz generated in the oscillation circuit 16C by means of the multiplier 16B.

The multiplied output S3 is supplied to a low-pass filter 16D having, e.g., a cut-off frequency of 2 [MHz]. A frequency signal having a frequency ($-1.00$ [MHz] to $+1.0$ [MHz]) difference between the oscillated outputs S1 and S2 is extracted from the multiplied output S3 and outputted as the first phase tracking signal $V_{OP}$.

The oscillated output S1 of the voltage-controlled oscillator 16A is multiplied by the frequency signal S4 derived via a 90-degree phase shifter 16F. The multiplied output S5 is supplied to a low-pass filter 16G having a cut-off frequency of 2 [MHz]. A frequency signal having a frequency difference ($-1.0$ [MHz] to $+1.0$ [MHz]) and a phase deviation of 90 degrees with respect to the first phase tracking signal $V_{OP}$ is outputted as the second phase tracking signal $V_{OQ}$.

In FIG. 6, the first phase and second phase tracking signals $V_{OP}$ and $V_{OQ}$ can thus be achieved which are constituted by continous sinusoidal waves having a mutually phase difference of 90° and which are proportional to the control signal $V_{CON}$ transmitted from the error signal forming circuit 15 (refer to FIG. 3).

In the first preferred embodiment in which the bi-phase tracking signal generating circuit 16 is provided, the transverse speed of the optical head 2 gradually increases from zero and rises from a state in which the optical head 2 is tracking one of the record tracks to a state in which the head 2 accesses the other record track. However, the first phase and second phase tracking signals $V_{OP}$ and $V_{OQ}$ can be generated which accurately follow the positional change in a positive or negative direction of the control signal $V_{CON}$ derived from the error signal forming circuit 15 according to the changing transverse speed of the optical head 2.

As described above with reference to FIG. 3 and FIG. 9, when the optical head 2 is started to access the other record track from one of the record tracks by means of the optical disc driving portion 4, the optical head 2 starts the traverse of the record track TR at an extremely low speed due to a mechanical inertia force at the initial stage from a time to. The transverse speed is increased in the gradually accelerated interval $T_1$ shown in FIG. 9 (acceleration interval $T_1$ as shown in FIG. 9) and, thereafter, remains in a constant, high-speed transverse (high speed transverse interval $T_2$ as shown in FIG. 9).

The detecting signals S11, S12, and S13 derived from the pits $P_A$, $P_B$, and $P_C$ are sampled by means of the sample/hold circuits 11A, 11B, and 11C in response to the standard sample clock signals $CK_A$, $CK_B$, and $CK_C$, each having the same frequency as the standard sample clock signal $CK_S$.

Figure 9:
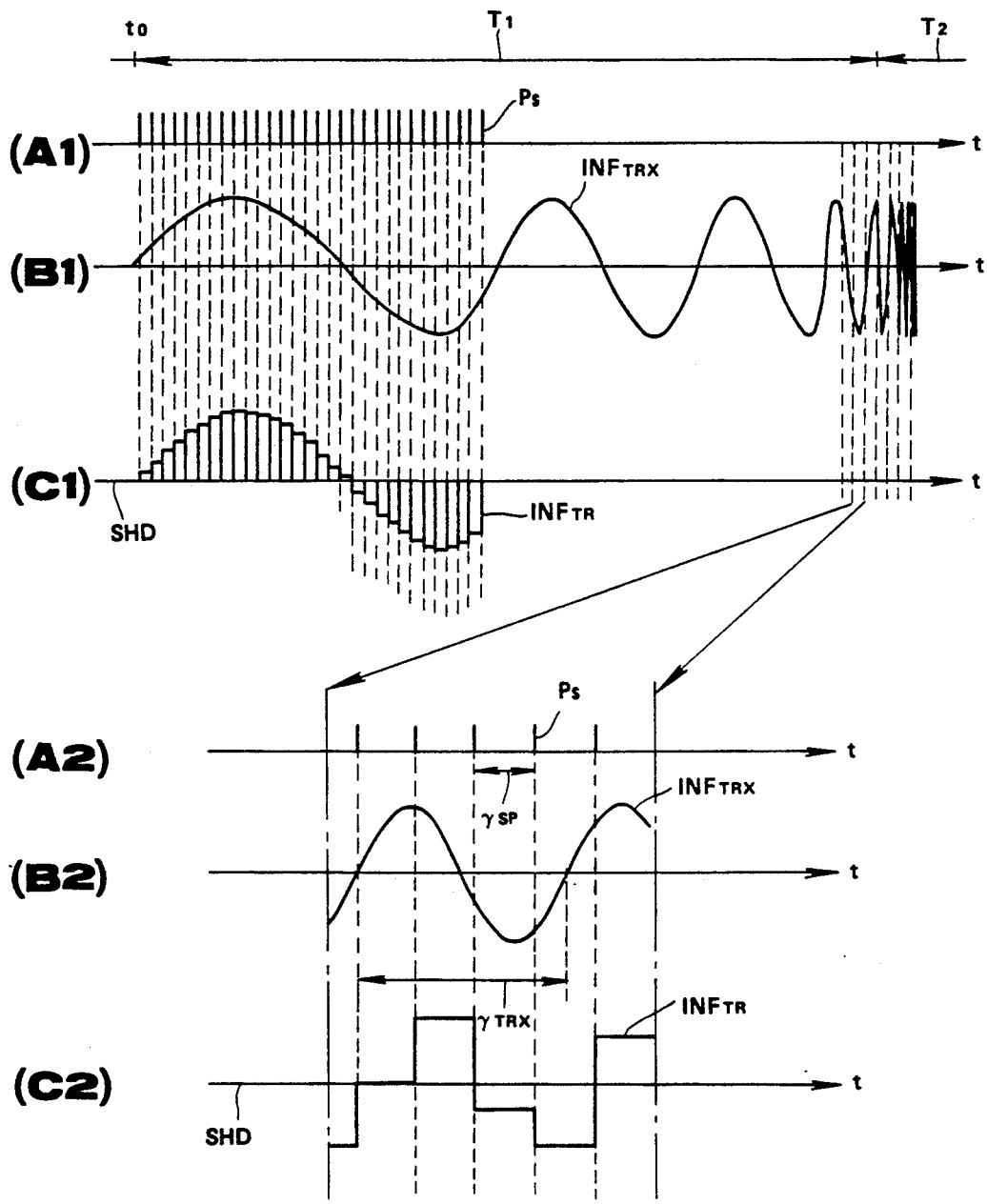
FIG. 9($A_1$, $B_1$, $C_1$, $A_2$, $B_2$, $C_2$) a schematic timing chart for explaining a tracking operation for the optical disc.

The bi-phase detecting signal forming circuit 11 actually retrieves the multiple samples of information during a change of one period of a phantom track transverse information $INF_{TRX}$ as shown in (B1) of FIG. 9 when the transverse speed of the read light beam LAR is very low. Therefore, the track transverse information $INF_{TR}$ substantially exhibiting the change of one period of the phantom track transverse information $INF_{TRX}$ can be sampled by means of the sample/hold circuits 11A, 11B, and 11C. Thus, the first phase and second phase detecting signals $V_P$ and $V_Q$ can be obtained having sinusoidal wave signals expressed in the equations (1) and (2) at output terminals of the bi-phase detecting signal forming circuit 11. The subtracted output $V_C$ of the subtractor 14 represents a phase difference between the first and second phase tracking signals and $V_{OP}$ and $V_{OQ}$ generated from the bi-phase tracking signal generating circuit 16.

The subtracted output $V_C$ has a value corresponding to a minute difference $-\Delta\phi$ representing a delay of the following operation of the bi-phase tracking signal generating circuit 16 and includes only low-frequency components. Hence, the sample/hold circuit 15A of FIG. 3 can sample and hold the subtracted output $V_C$ by means of the standard sample clock signal $CK_3$ and supply the control signal $V_{CON}$ according to the subtracted output $V_C$.

Thus, the bi-phase tracking signal generating circuit 16 generates the first phase and second phase tracking signals and $V_{OP}$ and $V_{OQ}$ having phases (hence, frequency) following the change in the phases (hence, frequencies) of the first and second phase detecting signals $V_P$ and $V_Q$ so as to perform a follow-up operation to zero the subtracted output $V_C$.

The follow-up operation is executed during an acceleration interval $T_1$ shown in FIG. 9 at which the speed of the optical head 2 becomes constantly high. When the acceleration interval shown in FIG. 9 as denoted by $T_1$ is ended and the speed is in an interval of the high speed transverse interval $T_2$, the oscillation frequency of the bi-phase tracking signal generating circuit 16 is increased to a frequency substantially equal to the frequency at the high speed transverse interval $T_2$ even if the frequencies of the first and second phase detecting signals $V_P$ and $V_Q$ become substantially equal to or shorter than the frequency of the standard sample clock signal $CK_S$.

Figure 10:
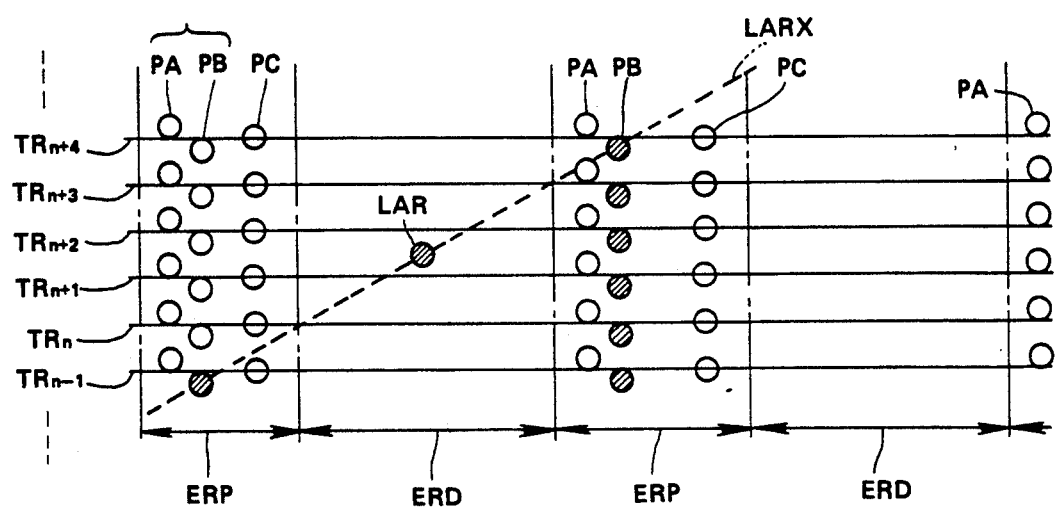
FIG. 10 is a schematic explanatory view of the optical disc and a trajectory of an optical head when the optical head accesses the record tracks at high speeds.

When the optical head 2 traverses the record tracks TR at a high speed, the number of samples of information of the first and second phase detecting signals $v_p$ and $V_Q$ constituting the track transverse information $INF_{TR}$ becomes extremely be reduced as appreciated from FIG. 10 with which the Background of the Art has been described. On the other hand, the subtracted output $V_C$ of the subtractor 14 indicates the phase difference of $-\Delta\phi$ between the first and second phase tracking signals $V_{OP}$ and $V_{OQ}$ whenever the first phase and second phase detecting signals $v_p$ and $v_q$ are sampled. The subtracted output $V_c$ is held by means of the sample/hold circuit 15A. Thereafter, the bi-phase signal tracking generating circuit 16 carries out the follow-up operation in response to the new incoming control signal $V_{CON}$.

Hence, the frequencies and phases of the first phase and second phase tracking signals $V_{OP}$ and $V_{OQ}$ are corrected whenever the first and second phase detecting signals $V_P$ and $V_Q$ are sampled so as to eliminate errors of the frequency and phase in the first and second phase detecting signals $v_p$ and $v_q$. Hence, the first and second phase tracking signals $V_{Op}$ and $V_{OQ}$ having the frequencies and phases of first and second phase detecting signals $v_p$ and $v_q$ and constituted by continuous waves can be obtained.

In the first preferred embodiment, since the optical head 2 is operated at the high transverse speed, the bi-phase tracking signal generating circuit 16 continues to output the first and second phase tracking signals $V_{OP}$ and $V_{OQ}$ in the continuous waveforms so as to compensate for the discrete detecting signals as the track transverse information $INF_{TR}$ even if only the discrete detecting signals as shown in FIG. 10 can be obtained as the track transverse information $INF_{TR}$.

Thus, even at the high speed transverse interval $T_2$, the transverse tracking counting circuit 17 can count the number of the record tracks TR on which the optical head 2 traverses without error.

Figure 7:
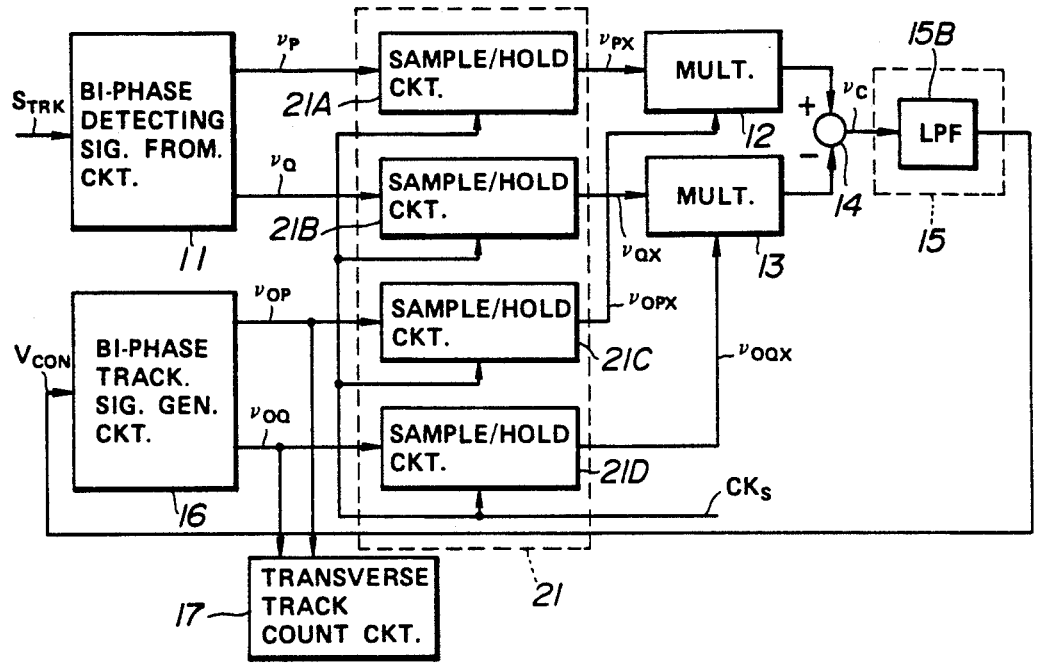
FIG. 7 is a simplified circuit block diagram of the track counting apparatus in a second preferred embodiment.

FIG. 7 shows a second preferred embodiment of the track counting apparatus 6.

In the second preferred embodiment, the sample/hold circuit 15A of FIG. 3 is omitted in the error signal forming circuit 15 and in place of the sample/hold circuit 15A, sample/hold circuits 21A and 21B which sample the incoming signals $v_P$ and $V_Q$ in response to the standard sample clock signal $CK_S$ are connected to output terminals of the bi-phase detecting signal forming circuit 11. In addition, other sample/hold circuits 21C and 21D are installed which operate in response to the standard sample clock signal $CK_S$ at output terminals of the first phase and second phase tracking signals $V_{OP}$ and $V_{OQ}$ of the bi-phase tracking signal generating circuit 16. These sample/hold circuits 21A, 21B, 21C and 21D constitute a signal sampling circuit 21.

In FIG. 7, as described above, the bi-phase detecting signal forming circuit 11 provides the first phase and second phase detecting signals $v_P$ and $V_Q$ and carries out the sampling at a time of the standard sample clock signal $CK_S$ through the sample/hold circuits 21A and 21B.

The first and second phase detecting signals $v_P$ and $V_Q$ retrieved discretely at a timing at which the read light beam LAR irradiates the tracking pits $P_A$ and $P_B$ and clocking signal pit $P_C$ are derived through the bi-phase detecting signal forming circuit 11, as described above. The first and second phase tracking signals are retrieved into the sample/hold circuits 21A and 21B and at the same timing the first and second phase tracking signals $V_{OP}$ and $V_{OQ}$ are retrieved into the sample/hold circuits 21C and 21D.

In the way described above, values sampled and held in the sample/hold circuits 21A and 21B represent positions between sequentially adjacent tracks TR on which the read light beam LAR irradiates (that is to say, a phase of the read light beam with respect to the track pitch).

On the other hand, sampled and held values in the sample/hold circuits 21C and 21D represent the phases of the first and second phase tracking signals $V_{OP}$ and $V_{OQ}$ constituted by the sinusoidal waves outputted continuously from the bi-phase tracking signal generating circuit 16. The subtracted output $V_C$ derived from the multipliers 12 and 13 and subtractor 14 represents the phase difference $\Delta\phi$ between the phases of the first phase detecting signals $v_P$ and $V_Q$ and those of the first and second phase tracking signals $v_{OP}$ and $v_{OQ}$. Hence, the bi-phase tracking signal generating circuit 16 continues to generate the first and second phase tracking signals $V_{OP}$ and $V_{OQ}$ having the frequencies and phases following the first and second phase detecting signals $v_P$ and $V_Q$.

In the way described above in the second preferred embodiment, when the number of traversed tracks are counted on the basis of the first and second phase tracking signals $V_{OP}$ and $V_{OQ}$ constituted by the sinusoidal waveform and generated continously from the bi-phase tracking signal generating circuit 16, the track counting circuit 17 can reliably count the number of the traversed tracks on which the read light beam has traversed even if the frequencies of the first and second phase tracking signals $V_P$ and $V_Q$ become equal to or higher than that of the standard sample clock signal $CK_S$ due to high speed traverse of the read light beam on the record tracks.

Figure 8:
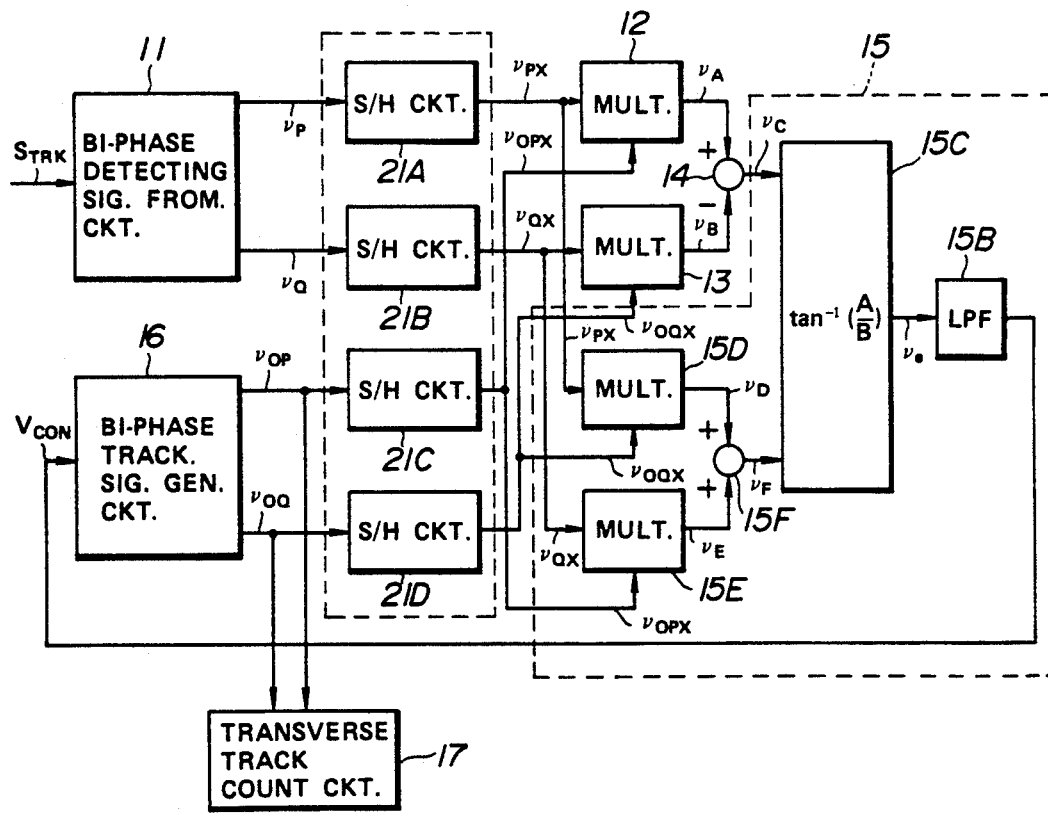
FIG. 8 is a simplified circuit block diagram of the track counting apparatus in a third preferred embodiment.

FIG. 8 shows a third preferred embodiment of the track counting apparatus 6.

The same numerals in FIG. 8 as those shown in FIG. 7 designate the corresponding elements.

As shown in FIG. 8, an inverse tangent converting circuit 15C is installed as the error signal forming circuit 15 for forming an error signal $V_e$ corresponding to the phase difference $\Delta\phi$ from the subtracted output $V_c$ derived from the subtractor 14.

The error signal forming circuit 15 derives the multiplied output $V_D$ indicating a multiplication of the sampled and held output $V_{PX}$ of the first phase detecting signal $V_P$ and sampled and held output $V_{OQX}$ of the second phase tracking signal $V_{OQ}$ by means of the multiplier 15D. The multiplier 15E multiplies the sampled and held output $V_{QX}$ of the second phase detecting signal $V_Q$ and sampled and held output $V_{OPX}$ of the first phase tracking signal $V_{OP}$. The multiplied output $V_E$ is added to the multiplied output $V_D$ by means of an adder 15F and the added output $V_F$ is supplied to the inverse tangent converting circuit 15C.

The sampled and held outputs and $V_{PX}$ and $V_{QX}$ of the first phase and second phase detecting signals $V_P$ and $V_Q$ are expressed as follows:

$$V_{PX}=\sin(2\pi vt) \tag{9}$$

$$V_{QX}=\cos(2\pi vt) \tag{10}$$

On the other hand, the sampled and held outputs $V_{OPX}$ and $V_{OQX}$ of the first phase and second phase tracking signals $V_{OP}$ and $V_{OQ}$ are expressed as follows:

$$V_{OPX}=\cos(2\pi vt+\Delta\phi) \tag{11}$$

$$V_{OQX}=\sin(2\pi vt+\Delta\phi) \tag{12}$$

Hence, the subtracted output $V_C$ of the subtractor 14 can be expressed as follows:

$$\begin{aligned} V_C &= V_{PX}V_{OPX} - V_{QX}V_{OQX} \\ &= \sin(2\pi vt)\cos(2\pi vt+\Delta\phi) - \cos(2\pi vt)\sin(2\pi vt+\Delta\phi) \\ &= -\sin\Delta\phi \end{aligned} \tag{13}$$

The added output $V_F$ of the adder 15F can be expressed as follows:

$$\begin{aligned} V_F &= V_{PX}V_{OQX} + V_{OPX} \\ &= \sin(2\pi vt)\sin(2\pi vt+\Delta\phi) + \cos(2\pi vt)\cos(2\pi vt+\Delta\phi) \\ &= \cos\Delta\phi \end{aligned} \tag{14}$$

If the inverse tangent converting circuit 15C executes the inverse tangent calculation on the basis of the added output $V_F$ and subtracted output $V_C$, the error signal $V_e$ derived at an output terminal of the circuit 15C is expressed in the following way as the phase difference $-\Delta\phi$.

$$\begin{aligned} V_e &= \tan^{-1}(V_c/V_F) \\ &= \tan^{-1}(-\sin\Delta\phi/\cos\Delta\phi) \\ &= -\Delta\phi \end{aligned} \tag{15}$$

The error signal forming circuit 15 transmits the error signal $V_e$ of the inverse tangent converting circuit 15C to the bi-phase tracking signal generating circuit 16 as the control signal $V_{CON}$ via the low-pass filter 15B.

In FIG. 8, the error signal $V_e$ representing the phase difference does not include the omitted calculation described above with reference to the equation (8) so that the bi-phase tracking signal generating circuit 16 can stably be in the PLL operation without influence of the large phase difference due to the large variation of, e.g., the tracking information $S_{TRK}$.

As described hereinabove, since in the track counting apparatus according to the present invention, the tracking signals having the frequencies and phases following those of the track transverse information are generated and the number of tracks which the optical head traverses are counted using the tracking signal, a signal(s) having a continous waveform(s) can be obtained as the tracking signal(s) even if a signal sampled discretely as the track transverse information has arrived at the counting apparatus. In addition, even if the transverse speed becomes remarkably increased, the number of tracks on which the optical head has traversed can be counted without error.

What is claimed is:

1. An apparatus for counting a number of record tracks which an optical head traverses, the apparatus comprising:

means for detecting pits formed on record tracks and generating track transverse information signals, formed as first and second signals with a mutual phase shift of $\pi/2$, by periodically sampling a continuous signal based on the detection of the pits as successive tracks are traversed by the optical head;

tracking signal generating means for generating tracking signals whose frequency and phase are varied so as to follow those of the track transverse information signals, including a signal forming circuit receiving a control signal for producing therefrom a first tracking signal and a second tracking signal whose phase is shifted by $\pi/2$ with respect to the first tracking signal, multiplying means for multiplying respective ones of said first and second signals and said first and second tracking signals, and a subtractor for subtracting respective outputs of said multiplying means, the output of said subtractor representing said control signal; and means for counting the number of record tracks which the optical head traverses on the basis of the first tracking signal and the second tracking signal generated by the tracking signal generating circuit.

2. An apparatus for counting a number of record tracks that an optical head traverses on the basis of a track transverse information signal derived through a periodic sampling of a signal indicative of track information discretely formed on record tracks, said track transverse information signal including a first signal and a second signal whose phase is shifted by $\pi/2$ with respect to the first signal the apparatus comprising:
 (a) tracking signal generating means for generating a first tracking signal that tracks the first signal and a second tracking signal that tracks the second signal, the frequency and phase of the first and second tracking signals being respectively varied so as to follow those of the track transverse information signal;
 (b) means for counting the number of tracks that the optical head traverses on the basis of first tracking signal and the second tracking signal;
 (c) first multiplying means receiving the first signal and first tracking signal and outputting the multiplied output of the first signal and first tracking signal;
 (d) second multiplying means receiving the second signal and second tracking signal and outputting the multiplied output of the second signal and second tracking signal; and
 (e) a subtractor which mutually subtracts the multiplied outputs of the first and second multiplying means, the output signal of the subtractor representing a first phase difference between the first signal and first tracking signal and between the second signal and second tracking signal caused by a variation of a speed at which the optical head traverses the record tracks and the output signal of the subtractor representing the first phase difference controlling the track signal generating means to derive the first tracking signal and second tracking signal.

3. An apparatus as set forth in claim 2, wherein the output signal of the subtractor representing the first phase difference is sampled and held and supplied to the tracking signal generating circuit via a low-pass filter.

4. An apparatus as set forth in claim 2, further comprising:
 (a) third multiplying means receiving the first signal and second tracking signal and outputting the multiplied output of the first signal and second tracking signal;
 (b) fourth multiplying means receiving the second signal and the first tracking signal and outputting the multiplied output of the second signal and the first tracking signal;
 (c) subtracting means receiving the output signal of the first multiplying means receiving the first signal and first tracking signal and the output of the second multiplying means receiving the second signal and the second tracking signal;
 (d) adding means receiving the output signal of the third multiplying means receiving the first signal and second tracking signal and the output of the fourth multiplying means receiving the second signal and first tracking signal; and
 (e) inverse tangent converting means receiving the outputs of the subtracting means and the adding means, the tracking signal generating circuit being controlled by an output signal of the inverse tangent converting means, thereby to derive the first and second tracking signals.

5. An apparatus for counting a number of record tracks that an optical head traverses on the basis of a track transverse information signal derived through a periodic sampling of a signal indicative of track information discretely formed on record tracks, said track transverse information signal including a first signal and a second signal whose phase is shifted by $\pi/2$ with respect to the first signal, the apparatus comprising:
 (a) tracking signal generating means for generating a first tracking signal that tracks the first signal and a second tracking signal that tracks the second signal, the frequency and phase of the first and second tracking signals being respectively varied so as to follow those of the track transverse information signal;
 (b) a counting means to count the number of tracks which the optical head has traversed based on the first tracking signal and the second tracking signal;
 (c) first multiplying means for multiplying the first signal and first tracking signal and producing a multiplied output signal;
 (d) second multiplying means for multiplying the second signal and second tracking signal and producing a multiplied output signal;
 (e) third multiplying means for multiplying the first signal and second tracking signal and producing a multiplied output signal;
 (f) fourth multiplying means for multiplying the second signal and first tracking signal and producing a multiplied output signal;
 (g) subtractor means receiving the output signal of the first multiplying means receiving the first signal and first tracking signal and the output signal of the second multiplying means receiving the second signal and second tracking signal;
 (h) adder means receiving the output signal of the third multiplying means receiving the first signal and second tracking signal and the output signal of the fourth multiplying means receiving the second signal and the first tracking signal; and
 (i) an inverse tangent converting circuit which receives the outputs of the subtractor and adder, the tracking signal generating circuit being controlled by the output signal of the inverse tangent converting circuit to derive the first tracking signal and second tracking signal.

6. An apparatus for counting a number of record tracks in an optical disc device having a movable optical head for a recordable disc on which tracking pits and clocking pits are previously formed in a discretely spaced apart manner, the counting apparatus comprising:
   (a) first means for providing a tracking error signal on the basis of the tracking pits;
   (b) second means for providing a clock reproduction signal on the basis of the clocking pits;
   (c) third means for generating a first tracking signal following a phase of the tracking error signal and generating a second tracking signal shifted in phase by $\pi/2$ of said first tracking signal and following a phase of the clock reproducing signal; and
   (d) fourth means for determining a phase difference between the first tracking signal and second tracking signal and including an up/down counter for calculating a frequency difference therebetween, said frequency difference representing the number of tracks that the optical head has traversed, said up/down counter being connected so that one of said first and second tracking signals is a clock input thereof and the other of said first and second tracking signals is an up/down control input thereof.

7. An apparatus for counting a number of record tracks in an optical disc device having a movable optical head for a recordable disc on which tracking pits and clocking pits are previously formed in a discretely spaced-apart manner, the counting apparatus comprising:
   (a) first means for providing a tracking error signal on the basis of the tracking pits;
   (b) second means for providing a clock reproduction signal on the basis of the clocking pits;
   (c) third means for generating a first tracking signal following a phase of the tracking error signal and generating a second tracking signal following a phase of the clock reproducing signal; and
   (d) fourth means for determining a phase difference between the first tracking signal and second tracking signal and calculating a frequency difference therebetween, said frequency difference representing the number of tracks that the optical head has traversed;
   (e) first multiplying means receiving the first signal and first tracking signal and outputting the multiplied output of the first signal and first tracking signal;
   (f) second multiplying means receiving the second signal and second tracking signal and outputting the multiplied output of the second signal and second tracking signal; and
   (g) a subtractor which mutually subtracts the multiplied outputs of the first and second multiplying means, the output signal of the subtractor representing a phase difference between the first signal and first tracking signal and between the second signal and second tracking signal caused by a variation of a speed at which the optical head traverses the record tracks and the output signal of the subtractor representing the phase difference for controlling the third means for generating the first tracking signal and second tracking signal.

8. An apparatus as set forth in claim 7, wherein the output signal of the subtractor representing the first phase difference is sampled and held and supplied to the tracking signal generating circuit via a low-pass filter.

9. An apparatus for counting a number of record tracks in an optical disc device having a movable optical head for a recordable disc on which tracking pits and clocking pits are previously formed in a discretely spaced-apart manner, the counting apparatus comprising:
   (a) first means for providing a tracking error signal on the basis of the tracking pits;
   (b) second means for providing a clock reproduction signal on the basis of the clocking pits;
   (c) third means for generating a first tracking signal following a phase of the tracking error signal and generating a second tracking signal following a phase of the clock reproducing signal; and
   (d) fourth means for determining a phase difference between the first tracking signal and second tracking signal and calculating a frequency difference therebetween, said frequency difference representing the number of tracks that the optical head has traversed;
   (e) first multiplying means for multiplying the first signal and first tracking signal and producing a multiplied output signal;
   (f) second multiplying means for multiplying the second signal and second tracking signal and producing a multiplied output signal;
   (g) third multiplying means for multiplying the first signal and second tracking signal and producing a multiplied output signal;
   (h) fourth multiplying means for multiplying the second signal and first tracking signal and producing a multiplied output signal;
   (i) a subtractor receiving the output signal of the first multiplying means and the output signal of the second multiplying means;
   (j) an adder receiving the output signal of the third multiplying means and the output signal of the fourth multiplying means; and
   (k) an inverse tangent converting circuit which receives the outputs of the subtractor and adder, the tracking signal generating circuit being controlled by means of the output signal of the inverse tangent converting circuit to derive the first tracking signal and second tracking signal.

* * * * *

UNITED STATES PATENT AND TRADEMARK OFFICE
CERTIFICATE OF CORRECTION

PATENT NO.   : 5,023,855

DATED        : June 11, 1991

INVENTOR(S)  : SEIJI KOBAYASHI, KIYOSHI OHSATO

It is certified that error appears in the above-identified patent and that said Letters Patent is hereby corrected as shown below:

COL. 1, line 61, alfter "LAR" insert -- irradiates--
COL. 2, lines 17 and 18, change "magnetically-optio" to
       --magneto-optically--
       line 47, change "$I_{TR}$" to -- $INF_{TR}$--
COL. 3, line 6, change "2" to --2 sp--
       line 23, change "$INF_{TR}$" to -- $INF_{TRX}$--
       line 46, after "above" insert --.--
COL. 4, line 66, after "$C_2$)" insert --is--
COL 5, line 50, change "(2)" to -- (1)--
       line 60, change "$V_{OQ}$" to -- $V_{OQ}=$--
COL. 6, line 59, change "phrase" to --phase--
COL. 9, line 42, delete "and" second occurrence
       line 56, delete "and " first occurrence

UNITED STATES PATENT AND TRADEMARK OFFICE
CERTIFICATE OF CORRECTION

PATENT NO. : 5,023,855

DATED : June 11, 1991

INVENTOR(S) : Seiji Kobayashi, Kiyoshi Ohsato

It is certified that error appears in the above-identified patent and that said Letters Patent is hereby corrected as shown below:

Col. 10, line 29, after "of" insert --the--

Col. 12, line 24, change "$V_{OQX}+V_{OPS}$" to --$V_{OQX} + V_{QX}V_{OPX}$--

In the Claims:

COL. 16, line 11, delete "first"

Signed and Sealed this

Eighth Day of December, 1992

Attest:

DOUGLAS B. COMER

Attesting Officer

Acting Commissioner of Patents and Trademarks